No. 704,053. Patented July 8, 1902.
G. H. LAYNG.
NUT LOCK.
(Application filed Oct. 4, 1901.)
(No Model.)
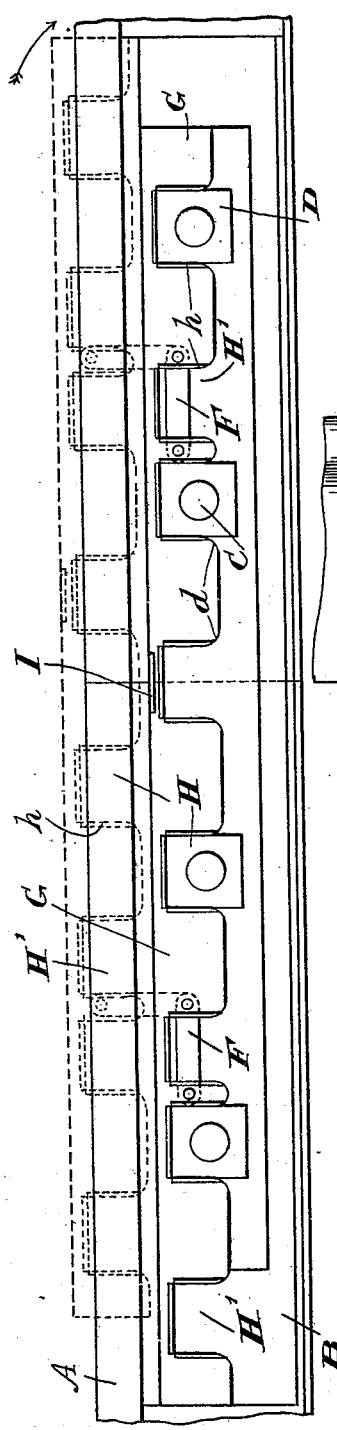
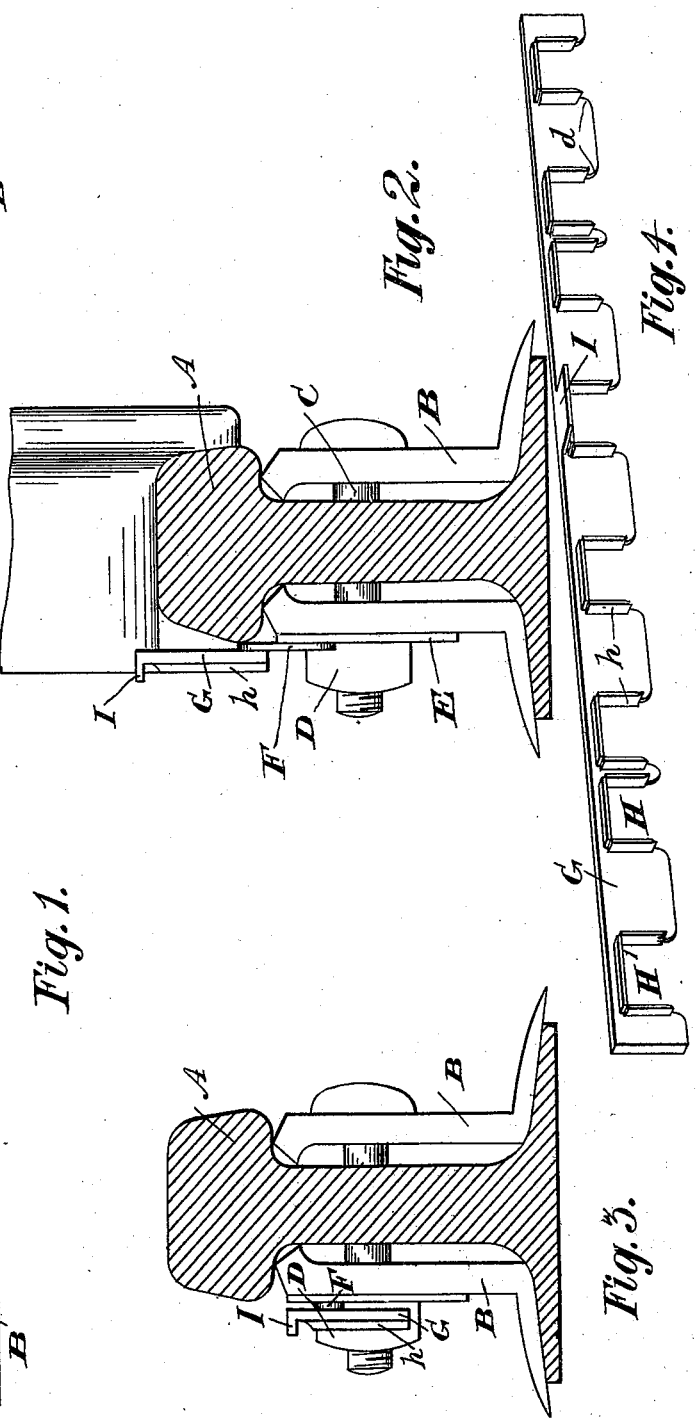
Witnesses.
T. F. Gerry
J. W. McDonald
Inventor.
G. H. Layng ature patent office.

GEORGE HENRY LAYNG, OF HAVELOCK, CANADA.

NUT-LOCK.

SPECIFICATION forming part of Letters Patent No. 704,053, dated July 8, 1902.

Application filed October 4, 1901. Serial No. 77,560. (No model.)

*To all whom it may concern:*

Be it known that I, GEORGE HENRY LAYNG, a subject of the King of Great Britain, residing at the town of Havelock, in the county of Peterborough, in the Province of Ontario, Canada, have invented certain new and useful Improvements in Nut-Locks, of which the following is a specification.

My invention relates to improvements in nut-locks; and the object of my invention is to more particularly design a nut-lock that can be easily and rapidly attached to one of the fish-plates connecting two rails together and lock the nuts of the bolts of same securely and that will, should the same be from any cause whatever moved out of place, be easily moved back to place either by hand or else by the first wheels of a train that may be passing over the rails; and it consists, essentially, of a locking-bar provided with a suitable number of suitably-placed recesses designed to sufficiently engage the sides of a like number of nuts screwed onto their bolts and so lock same, the said locking-bar being pivoted to a suitable base, and other details of construction, as hereinafter more particularly explained.

Figure 1 is a side elevation of my nut-lock attached to a fish-plate joining the adjacent ends of two rails, showing the locking-bar of same in two positions. Fig. 2 is a vertical section through a rail looking at the end of my nut-lock attached to a fish-plate, showing the locking-bar of same up out of engagement with the nuts of the bolts and a portion of a car-wheel about to strike same and knock it into position. Fig. 3 shows a view similar to Fig. 2, only with the locking-bar knocked into position and locking the nuts after the car-wheel has passed over the rail. Fig. 4 is a perspective view of the locking-bar itself.

In the drawings like letters of reference indicate corresponding parts in each figure.

A represents the rails, and B B the fish-plates. C represents the bolts passing through said rails and fish-plates, and D nuts of same.

E is a plate, preferably made in one piece, and through which the bolts C pass. The nuts D are jammed against the plate E. Suitably pivoted to the plate E, as by stiff links F, is a locking-bar G, provided with recesses H, opening from its lower edge. The lower corners *d* of the recesses H are rounded, as shown, so that when the locking-bar G is moved so as to lock the nuts D the sides of same may be moved as closely as possible to the engaged sides of the nuts and prevent any loosening of same. If I wish, I may provide each side of the recesses H with flanges *h*, and thus bring a larger additional area of the locking-bar G into contact with the nuts D, as shown, than if I constructed said recesses without said flanges. If for any reason the locking-bar G be moved out of contact with the nuts D—into the position shown in Figs. 1 and 2, for example—the first pair of wheels of a train will strike said locking-bar and immediately knock same back into position. In order to enable the locking-bar G to operate, no matter in which direction the train may be moving, I provide another set of recesses H', placed, as shown, so that if, for example, the locking-bar be moved from its dotted position in the direction indicated by arrow the sides of its recesses H' will engage with and lock the nuts D without any trouble. I may also provide the recesses H' with flanges *h*. The pivoting of the locking-bar is such as will permit ready movement of same, but will not allow the parts to rattle, and under ordinary conditions if the said locking-bar were to be moved out of contact with the nuts H it would be brought back into position by gravity. The changes in weather may cause the locking-bar's pivoted movement to be more or less free; but if the said locking-bar were to be moved and stay in such position that the wheels of a train will strike same, it would be immediately forced back to normal on account of the sudden blow given by the wheels.

I provide the plate E to enable me to pivot the locking-bar G thereto, so that I can attach my nut-lock to any rail; but it will be understood that my nut-lock would operate perfectly if same were pivoted direct to the fish-plate. It may be advisable often to do this.

I is a lip secured to or forming part of the locking-bar G, preferably midway of the length of same, as shown, to enable the said locking-bar to be moved for any desired purpose.

It will of course be understood that I may, if desired, make the locking-bar G up of a number of independent sections pivoted independently to a fish-plate or else provided with its plate E; but I preferably manufacture the nut-lock as shown in the drawings.

My nut-lock is preferably secured on the outside of the rail.

My nut-lock can of course be adapted to other purposes than those described in this specification, such as are within the sphere of an ordinarily skilled mechanic, and I claim such to fall within the scope of my invention.

What I claim as my invention, and desire to secure by Letters Patent, is—

A nut-lock comprising a base-plate through which the bolts of the nuts to be locked, pass, and against which the nuts are jammed, a locking-bar provided with a suitable number of recesses, the sides of said recesses being provided with flanges which are designed to engage the sides of the nuts to be locked and lock the same, the lower corners of said recesses being rounded, and links connecting said locking-bar to said base-plate, as and for the purpose specified.

In testimony whereof I have signed my name to this specification in the presence of two subscribing witnesses.

GEORGE HENRY LAYNG.

Witnesses:
JNO. C. SHERRY,
CHRISTENA LAYNG.